United States Patent
Morita et al.

(10) Patent No.: US 10,978,926 B2
(45) Date of Patent: Apr. 13, 2021

(54) MOTOR COIL SUBSTRATE

(71) Applicant: IBIDEN CO., LTD., Ogaki (JP)

(72) Inventors: Haruhiko Morita, Ogaki (JP); Shinobu Kato, Ogaki (JP); Hitoshi Miwa, Ogaki (JP); Hisashi Kato, Ogaki (JP); Toshihiko Yokomaku, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 135 days.

(21) Appl. No.: 16/270,642

(22) Filed: Feb. 8, 2019

(65) Prior Publication Data
US 2019/0245401 A1    Aug. 8, 2019

(30) Foreign Application Priority Data

Feb. 8, 2018 (JP) .............. JP2018-020782

(51) Int. Cl.
*H02K 3/26* (2006.01)
*H02K 3/28* (2006.01)
*H02K 11/00* (2016.01)
*H02K 13/00* (2006.01)
*H02K 23/58* (2006.01)
*H02K 11/215* (2016.01)

(52) U.S. Cl.
CPC ............... *H02K 3/26* (2013.01); *H02K 3/28* (2013.01); *H02K 11/215* (2016.01); *H02K 13/006* (2013.01); *H02K 23/58* (2013.01); *H02K 2203/03* (2013.01)

(58) Field of Classification Search
CPC .......... H02K 3/26; H02K 3/28; H02K 13/006; H02K 23/58; H02K 11/215; H02K 2203/03
See application file for complete search history.

(56) References Cited

U.S. PATENT DOCUMENTS

| 4,271,370 A | * | 6/1981 | DiMeo ............... H02K 13/08 310/207 |
| 2009/0072651 A1 | * | 3/2009 | Yan ............... H02K 15/0407 310/179 |
| 2011/0140564 A1 | * | 6/2011 | Nomura ............... H02K 3/26 310/208 |

FOREIGN PATENT DOCUMENTS

| JP | H05-276699 | 10/1993 |
| JP | 2011-087437 | 4/2011 |

* cited by examiner

*Primary Examiner* — Thomas Truong
(74) *Attorney, Agent, or Firm* — Oblon, McClelland, Maier & Neustadt, L.L.P.

(57) ABSTRACT

A motor coil substrate includes a flexible insulating substrate having a cylindrical shape, wirings formed on a first surface of the flexible insulating substrate and a second surface of the flexible insulating substrate on the opposite side with respect to the first surface, and via conductors including copper plating penetrating through the flexible insulating substrate such that the via conductors are connecting the wirings formed on the first surface and the wirings formed on the second surface. The wirings and the via conductors form coils formed in spiral shapes, and the flexible insulating substrate is wound more than one turn in a circumferential direction of the cylindrical shape such that the first surface on an inner side of the cylindrical shape and the second surface on an outer side of the cylindrical shape oppose each other.

20 Claims, 11 Drawing Sheets

# MOTOR COIL SUBSTRATE

CROSS-REFERENCE TO RELATED APPLICATIONS

The present application is based upon and claims the benefit of priority to Japanese Patent Application No. 2018-020782, filed Feb. 8, 2018, the entire contents of which are incorporated herein by reference.

BACKGROUND OF THE INVENTION

Field of the Invention

The present invention relates to a motor coil substrate forming an armature of a DC motor.

Description of Background Art

Japanese Patent Laid-Open Publication No. HEI 5-276699 describes a coil body formed by laminating laminated coils in a cylindrical flexible insulating substrate. Japanese Patent Laid-Open Publication No. 2011-87437 describes a coreless armature in which one coil substrate is wound multiple turns in a circumferential direction via an insulating sheet to form a cylindrical shape. The entire contents of these publications are incorporated herein by reference.

SUMMARY OF THE INVENTION

According to one aspect of the present invention, a motor coil substrate includes a flexible insulating substrate having a cylindrical shape, wirings formed on a first surface of the flexible insulating substrate and a second surface of the flexible insulating substrate on the opposite side with respect to the first surface, and via conductors including copper plating penetrating through the flexible insulating substrate such that the via conductors are connecting the wirings formed on the first surface and the wirings formed on the second surface. The wirings and the via conductors form coils formed in spiral shapes, and the flexible insulating substrate is wound more than one turn in a circumferential direction of the cylindrical shape such that the first surface on an inner side of the cylindrical shape and the second surface on an outer side of the cylindrical shape oppose each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
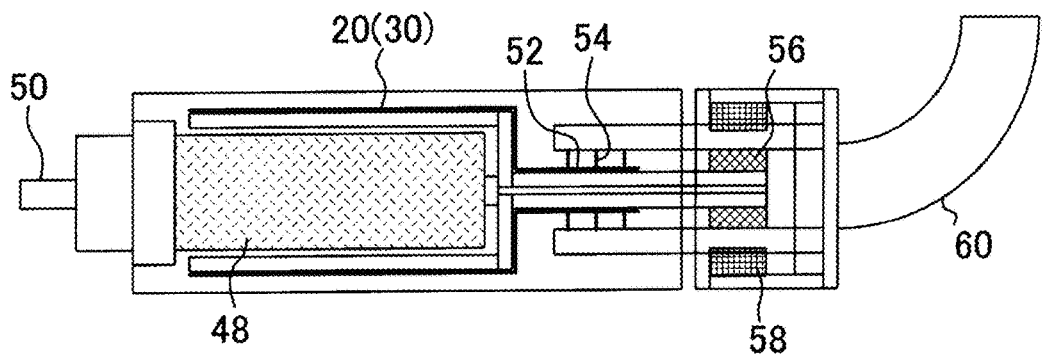
FIG. 1A is a cross-sectional view of a DC motor using a motor coil substrate of a first embodiment.

Embodiments will now be described with reference to the accompanying drawings, wherein like reference numerals designate corresponding or identical elements throughout the various drawings.

First Embodiment

FIG. 1A is a cross-sectional view of a DC motor 10 using a motor coil substrate of a first embodiment.

The DC motor 10 includes: an armature (rotor) 30 including a motor coil substrate 20 of the first embodiment; a magnet 48; an output shaft 50; a commutator 52; a brush 54; an angle detection magnet 56; a Hall element 58; and a cable 60. The Hall element 58 is arranged at a position opposing the angle detection magnet 56.

Figure 1B:
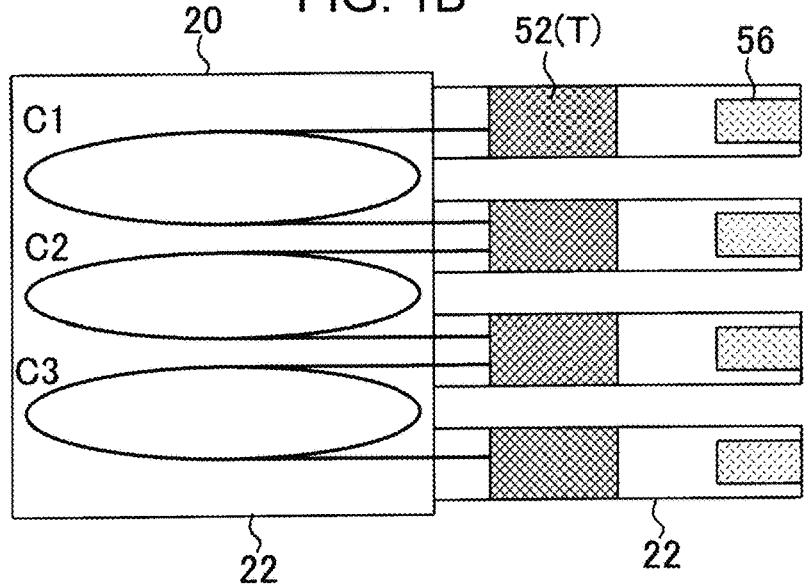
FIG. 1B is a developed plan view of the motor coil substrate.
Figure 1C:
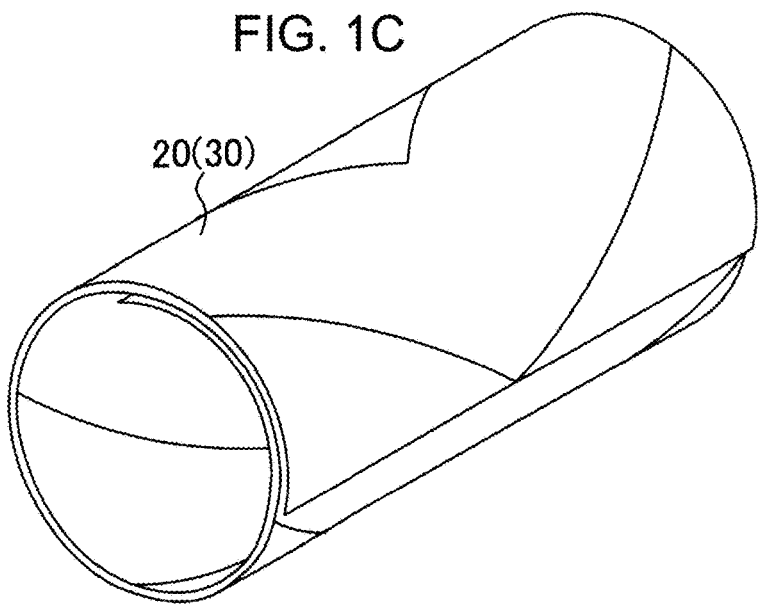
FIG. 1C is a perspective view of the motor coil substrate.

FIG. 1B is a developed plan view of the motor coil substrate. FIG. 1C is a perspective view of the motor coil substrate 20 forming the armature 30.

The motor coil substrate 20 has coils (C1, C2, C3) formed by a plating pattern on a flexible polyimide insulating substrate 22, the commutator (motor internal terminal) 52 connected to the coils (C1, C2, C3), and the angle detection magnet 56 arranged at a position corresponding to the coils (C1, C2, C3). The commutator (motor internal terminal) 52 is formed of a metal plate having abrasion resistance against the brush, and is arranged on a connection wiring (not illustrated in the drawings) formed simultaneously with a coil connected to the coils (C1, C2, C3). In the motor coil substrate 20, seven coils (C1-C7) are arranged, but only the three coils (C1, C2, C3) are illustrated in FIG. 1B. A surface of the angle detection magnet is divided into 3 or 4 portions by grooves for improving angle detection accuracy of a motor provided on the angle detection magnet 56. As illustrated in FIG. 1C, the motor coil substrate 20 is wound 2.5 turns in the circumferential direction (axial direction of the motor).

Since the commutator (motor internal terminal) 52 and the angle detection magnet 56 are provided together with the coils on one insulating substrate, the motor coil substrate 20 of the first embodiment has a simple structure and has an effect of being easy to be manufactured.

Figure 2A:
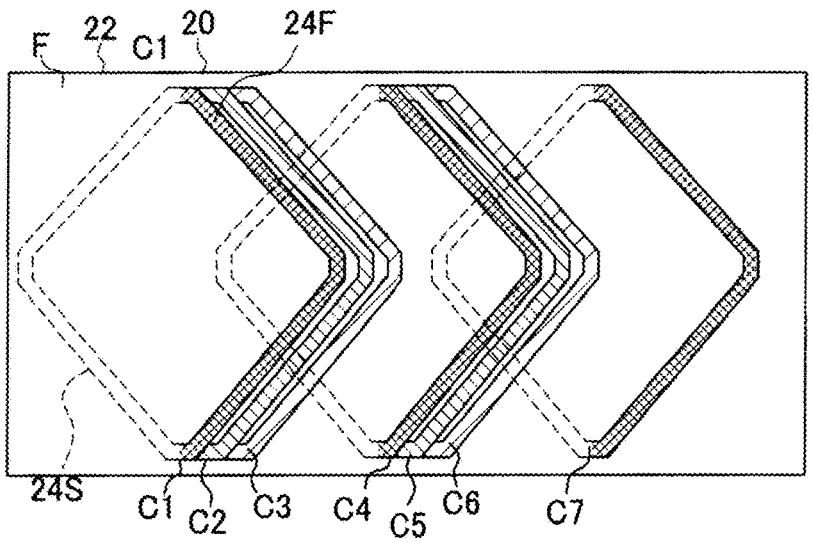
FIG. 2A is a schematic diagram illustrating structures of coils of the motor coil substrate.
Figure 2B:
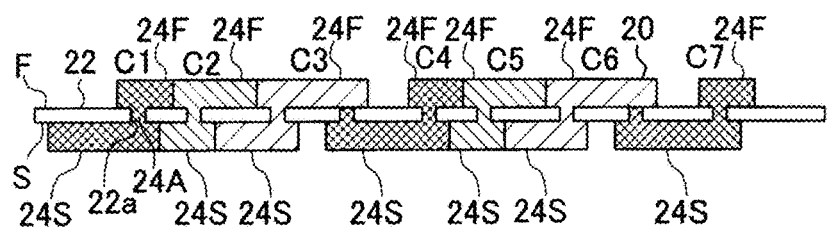
FIG. 2B is a schematic diagram illustrating cross-sectional shapes of the coils of the motor coil substrate.
Figure 2C:
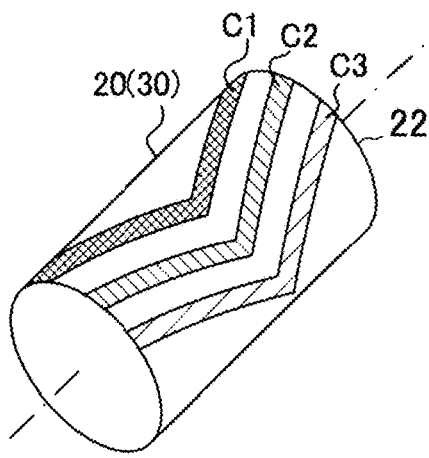
FIG. 2C is a perspective view of the motor coil substrate.

FIG. 2A is a schematic diagram illustrating structures of the coils of the motor coil substrate 20. FIG. 2B is a schematic diagram illustrating cross-sectional shapes of the coils of the motor coil substrate 20. FIG. 2C is a perspective view of the motor coil substrate.

The insulating substrate 22 has a first surface (F) and a second surface (S) on an opposite side with respect to the first surface.

A first wiring (24F) forming a half turn of the rhombic coil (C1) is formed on the first surface (F) of the insulating substrate 22. A second wiring (24S) forming the remaining half turn is formed on the second surface (S) of the insulating substrate 22. The first wiring (24F) of the half turn and the second wiring (24S) of the remaining half turn are connected to each other via a via conductor (24A) formed in a through hole (22a) in the insulating substrate 22. The first wiring (24F), the second wiring (24S), and the via conductor (24A) are formed by copper plating. Here, the coils (C1-C7) are each formed to wind in a 35-turn spiral shape. In the first embodiment, the coils are each formed to wind 35 turns. However, the number of turns is for an exemplary purpose, and the coils can be formed to have any number of turns.

As illustrated in FIG. 2B, the first wiring (24F) of the coil (C1) on the first surface (F) side partially overlaps with the second wiring (24S) of the coil (C2) on the second surface (S) side. Similarly, the first wirings (24F) of the coils (C2-C6) on the first surface (F) side respectively partially overlap with the second wirings (24S) of the coils (C3-C7) on the second surface (S) side.

As illustrated in FIG. 2C, the motor coil substrate 20 having the coils (C1-C7) having the partially overlapping wirings is wound 2.5 turns in the circumferential direction (axial direction of the motor) such that the first surface (F) on an inner side and the second surface (S) on an outer side of the insulating substrate 22 oppose each other.

Figure 3A:
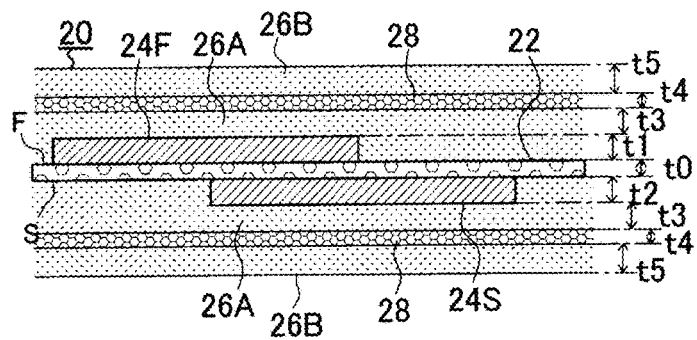
FIG. 3A illustrates thicknesses of the motor coil substrate.
Figure 3B:
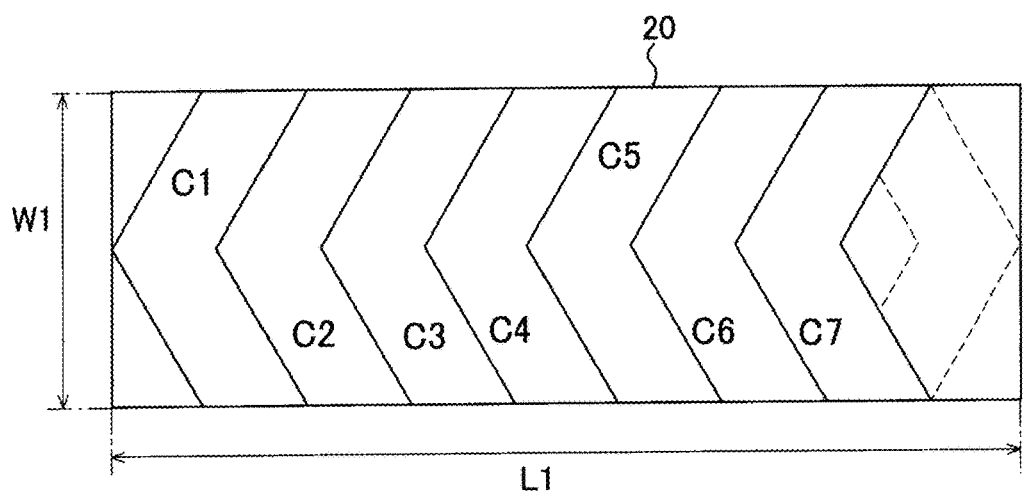
FIG. 3B is a plan view of the motor coil substrate illustrating a coil arrangement.
Figure 3C:
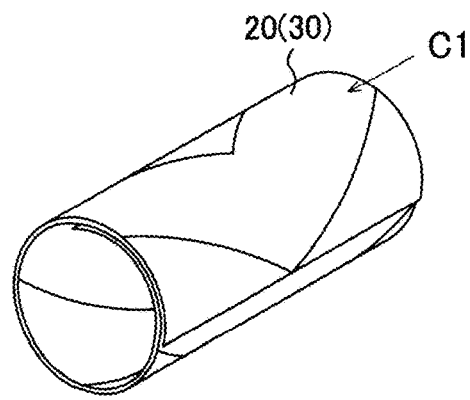
FIG. 3C is a perspective view illustrating an arrangement position of a coil (C1)
Figure 3D:
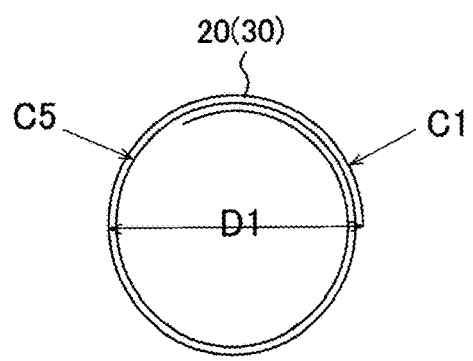
FIG. 3D is a side view of an armature illustrating arrangement positions of the coil (C1) and a coil (C5)

FIG. 3A illustrates thicknesses of the motor coil substrate 20. FIG. 3B is a plan view of the motor coil substrate 20 illustrating a coil arrangement. FIG. 3C is a perspective view illustrating an arrangement position of the coil (C1). FIG. 3D is a side view of the armature illustrating arrangement positions of the coil (C1) and the coil (C5).

The insulating substrate 22 has a thickness (t0) of 12.5 μm, the first wiring (24F) has a thickness (t1) of 45 μm, and the second wiring (24S) has a thickness (t2) of 45 μm. An adhesive layer (26A) having a thickness (t3) (35 μm) and a coverlay 28 having a thickness (t4) (12.5 μm) are formed on the first wiring (24F) and on the second wiring (24S). Further, an adhesive layer (26B) having a thickness (t5) (35 μm) for maintaining a coil shape is formed on the coverlay 28 of the first surface (F) and on the coverlay 28 of the second surface (S).

As illustrated in FIG. 3B, a width (W1) of the coils (C1-C7) is 18 mm, and a circumferential direction length (L1) of the width (W1) of the coils (C1-C7) is 52.5 mm. The coils (C1-C7) are arranged at equal intervals. In the first embodiment, the coils are arranged at equal intervals. However, it is also possible that the coils are arranged at unequal intervals.

As illustrated in FIGS. 3C and 3D, the motor coil substrate 20 wound 2.5 turns forms the armature 30. FIG. 3D illustrates the arrangement positions of the coil (C1) and the coil (C5). The armature 30 has an outer diameter (D1) of 7.9 mm.

Figure 4:
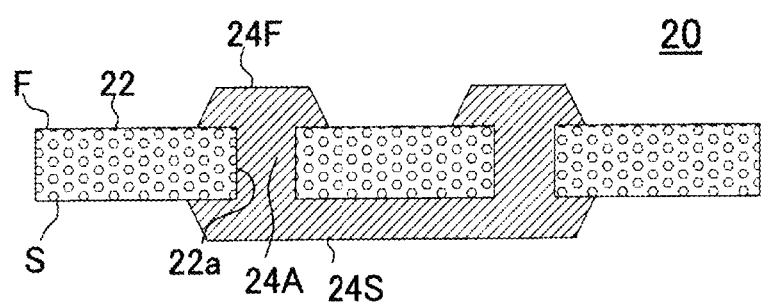
FIG. 4 is a cross-sectional view of the motor coil substrate of the first embodiment.

FIG. 4 is a cross-sectional view of the motor coil substrate of the first embodiment.

The first wiring (24F) formed on the first surface (F) of the insulating substrate 22 has a convex shape tapering toward outside of the insulating substrate. The second wiring (24S) formed on the second surface (S) of the insulating substrate 22 has a convex shape tapering toward outside of the insulating substrate. Since the first wiring (24F) and the second wiring (24S) are symmetrically formed with respect to a center of the insulating substrate 22, reliability is high with respect to rotation and cogging of the motor.

Since the motor coil substrate 20 of the first embodiment is wound 2.5 turns in the circumferential direction such that first surface (F) on an inner side and the second surface (S) on an outer side of the insulating substrate 22 oppose each other, a 2.5 times higher torque can be generated as compared to an 1-turn armature of the same diameter. The coils including the first wirings (24F) on the first surface (F) and the second wirings (24S) on the second surface (S) of the insulating substrate 22 are connected to each other by the via conductors (24A) formed of copper plating penetrating the insulating substrate 22. Therefore, different from solder connection, high reliability can be obtained and, since an electric current flows through the via conductors having low resistances, high efficiency can be realized.

First Modified Embodiment of First Embodiment

Figure 5:
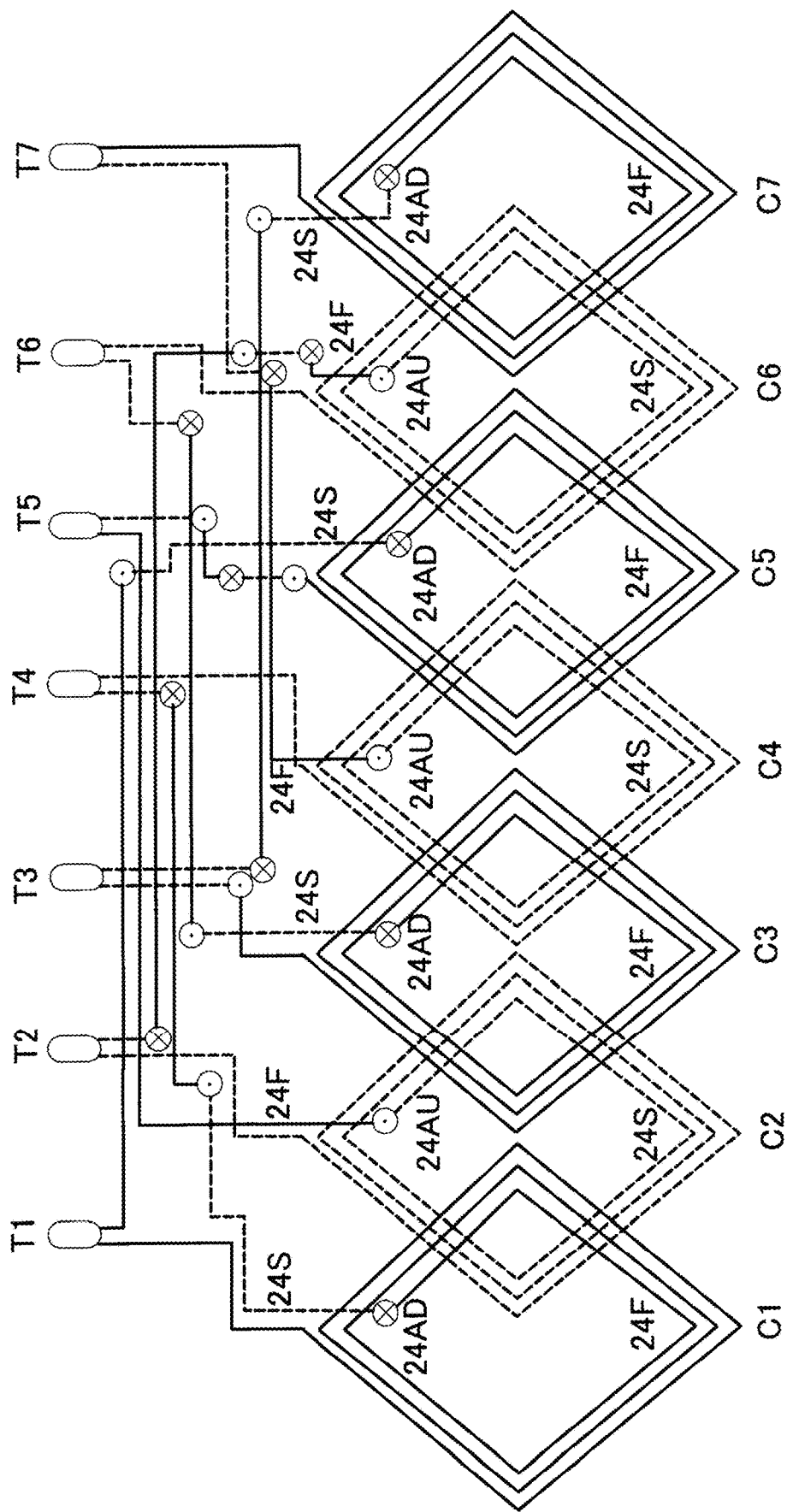
FIG. 5 illustrates coil connection of a motor coil substrate according to a first modified embodiment of the first embodiment.

FIG. 5 illustrates a coil arrangement of a motor coil substrate according to a first modified embodiment of the first embodiment.

The motor coil substrate has seven coils (C1-C7) and terminals (commutators) (T1-T7) respectively connected to the coils (C1-C7). The coil (C1) includes a first wiring (24F) formed on the first surface of the insulating substrate and indicated by a solid line. The coil (C2) includes a second wiring (24S) formed on the second surface of the insulating substrate and indicated by a dashed line. The coil (C3) includes a first wiring (24F) formed on the first surface of the insulating substrate. The coil (C4) includes a second wiring (24S) formed on the second surface of the insulating substrate. The coil (C5) includes a first wiring (24F) formed on the first surface of the insulating substrate. The coil (C6) includes a second wiring (24S) formed on the second surface of the insulating substrate. The coil (C7) includes a first wiring (24F) formed on the first surface of the insulating substrate.

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). The coil (C1) connected to the terminal (T1) is connected to the terminal (T4) via a second wiring (24S) which is connected via a downward via conductor (24AD) to an end of the first wiring (24F) arranged in a spiral shape. The coil (C2) connected to the terminal (T2) is connected to the terminal (T5) via a first wiring (24F) which is connected via an upward via conductor (24AD) to an end of the second wiring (24S) arranged in a spiral shape. The coil (C3) connected to the terminal (T3) is connected to the terminal (T6) via a second wiring (24S) which is connected via a downward via conductor (24AD) to an end of the first wiring (24F) arranged in a spiral shape. The coil (C4) connected to the terminal (T4) is connected to the terminal (T7) via a first wiring (24F) which is connected via an upward via conductor (24AU) to an end of the second wiring (24S) arranged in a spiral shape. The coil (C5) connected to the terminal (T5) is connected to the terminal (T1) via a second wiring (24S) which is connected via a downward via conductor (24AD) to an end of the first wiring (24F) arranged in a spiral shape. The coil (C6) connected to the terminal (T6) is connected to the terminal (T2) via a first wiring (24F) which is connected via an upward via conductor (24AU) to an end of the second wiring (24S) arranged in a spiral shape. The coil (C7) connected to the terminal (T7) is connected to the terminal (T3) via a second wiring (24S) which is connected via a downward via conductor (24AD) to an end of the first wiring (24F) arranged in a spiral shape.

The coil (C2) on the second surface (S) side of the insulating substrate is arranged so as to partially overlap with the coil (C1) and the coil (C3) on the first surface (F) side of the insulating substrate. The coil (C4) on the second surface (S) side of the insulating substrate is arranged so as to partially overlap with the coil (C3) and the coil (C5) on the first surface (F) side of the insulating substrate. The coil (C6) on the second surface (S) side of the insulating substrate is arranged so as to partially overlap with the coil (C5) and the coil (C7) on the first surface (F) side of the insulating substrate. In the drawing, the coils (C1-C7) are drawn to each have 3 turns. However, in an embodiment product, the coils are each formed in 35 turns. In the rhombic coils of the motor coil substrate of the first modified embodiment of the first embodiment, an inner diameter of each of the coils can be enlarged and a torque can be increased.

Second Modified Embodiment of First Embodiment

Figure 6:
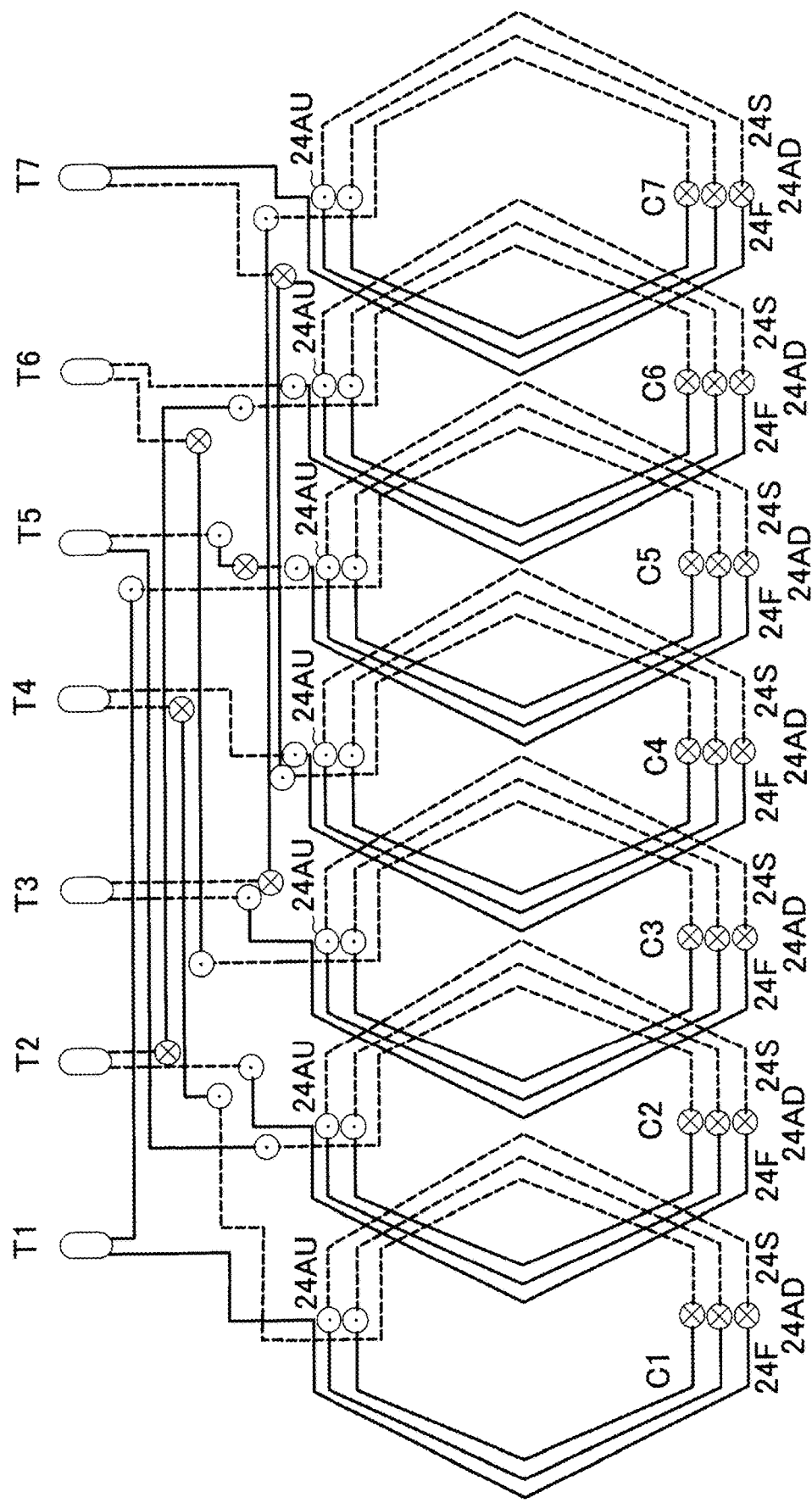
FIG. 6 illustrates coil connection of a motor coil substrate according to a second modified embodiment of the first embodiment.

FIG. 6 illustrates a coil arrangement of a motor coil substrate according to a second modified embodiment of the first embodiment.

The motor coil substrate has seven coils (C1-C7) and terminals (commutators) (T1-T7) respectively connected to the coils (C1-C7). The hexagonal coils (C1-C7) each include a half-turn first wiring (24F) formed on the first surface of the insulating substrate and a half-turn second wiring (24S) formed on the second surface of the insulating substrate. The half-turn first wiring (24F) and the half-turn second wiring (24S) are connected to each other via an upward via conductor (24AU) and a downward via conductor (24AD).

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The first wiring (24F) of the coil (C2) on the first surface side of the insulating substrate is arranged so as to overlap with the second wiring (24S) of the coil (C1) on the second surface side of the insulating substrate. The first wiring (24F) of the coil (C3) on the first surface side of the insulating substrate is arranged so as to overlap with the second wiring (24S) of the coil (C2) on the second surface side of the insulating substrate. The first wiring (24F) of the coil (C4) on the first surface side of the insulating substrate is arranged so as to overlap with the second wiring (24S) of the coil (C3) on the second surface side of the insulating substrate. The first wiring (24F) of the coil (C5) on the first surface side of the insulating substrate is arranged so as to overlap with the second wiring (24S) of the coil (C4) on the second surface side of the insulating substrate. The first wiring (24F) of the coil (C6) on the first surface side of the insulating substrate is arranged so as to overlap with the second wiring (24S) of the coil (C5) on the second surface side of the insulating substrate. The first wiring (24F) of the coil (C7) on the first surface side of the insulating substrate is arranged so as to overlap with the second wiring (24S) of the coil (C6) on the second surface side of the insulating substrate. In the drawing, the coils (C1-C7) are drawn to each have 3 turns. However, in an embodiment product, the coils are each formed in 35 turns. In the hexagonal coils of the motor coil substrate of the second modified embodiment of the first embodiment, an inner diameter of each of the coils can be enlarged as compared to rhombic coils, and a torque can be increased.

Third Modified Embodiment of First Embodiment

Figure 7:
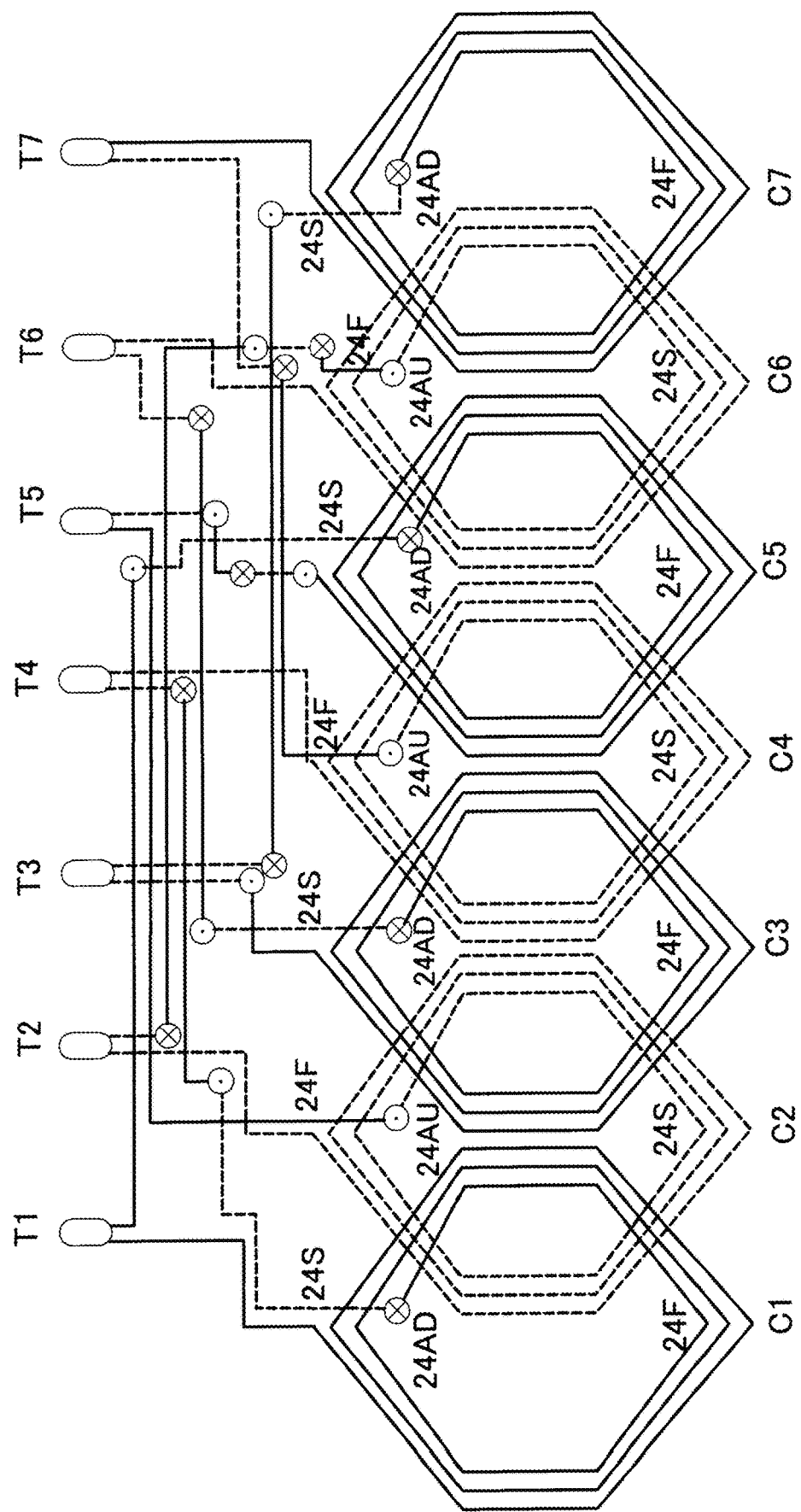
FIG. 7 illustrates coil connection of a motor coil substrate according to a third modified embodiment of the first embodiment.

FIG. 7 illustrates a coil arrangement of a motor coil substrate according to a third modified embodiment of the first embodiment.

The motor coil substrate has seven coils (C1-C7) and terminals (commutators) (T1-T7) respectively connected to the coils (C1-C7). The coil (C1) includes a first wiring (24F) formed on the first surface of the insulating substrate. The coil (C2) includes a second wiring (24S) formed on the second surface of the insulating substrate. The coil (C3) includes a first wiring (24F) formed on the first surface of the insulating substrate. The coil (C4) includes a second wiring (24S) formed on the second surface of the insulating substrate. The coil (C5) includes a first wiring (24F) formed on the first surface of the insulating substrate. The coil (C6) includes a second wiring (24S) formed on the second surface of the insulating substrate. The coil (C7) includes a first wiring (24F) formed on the first surface of the insulating substrate.

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The coil (C2) on the second surface (S) side of the insulating substrate is arranged so as to partially overlap with the coil (C1) and the coil (C3) on the first surface (F) side of the insulating substrate. The coil (C4) on the second surface (S) side of the insulating substrate is arranged so as to partially overlap with the coil (C3) and the coil (C5) on the first surface (F) side of the insulating substrate. The coil (C6) on the second surface (S) side of the insulating substrate is arranged so as to partially overlap with the coil (C5) and the coil (C7) on the first surface (F) side of the insulating substrate. In the drawing, the coils (C1-C7) are drawn to each have 3 turns. However, in an embodiment product, the coils are each formed in 35 turns. In the hexagonal coils of the motor coil substrate of the third modified embodiment of the first embodiment, an inner diameter of each of the coils can be enlarged, and a torque can be increased.

Fourth Modified Embodiment of First Embodiment

Figure 8:
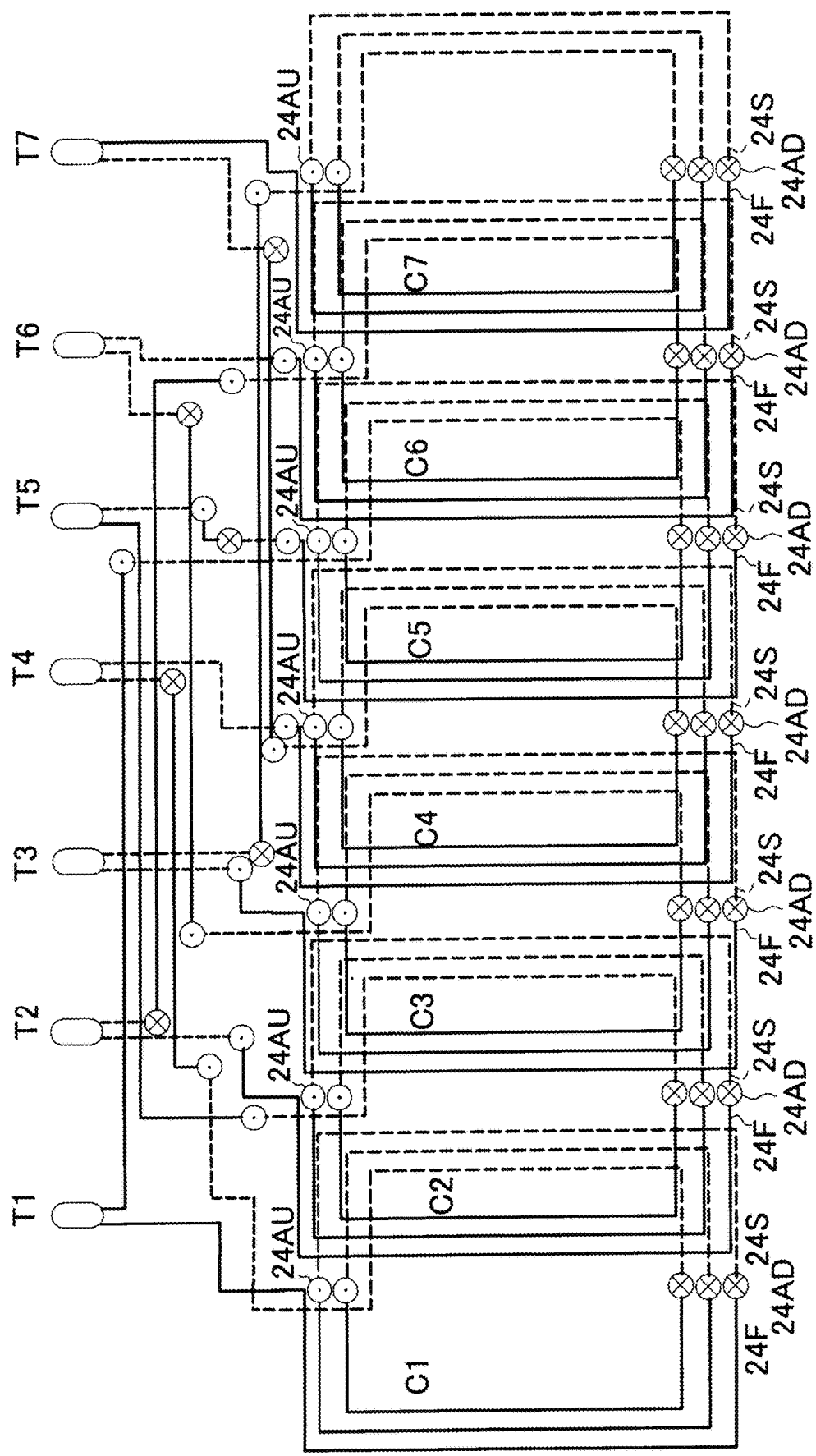
FIG. 8 illustrates coil connection of a motor coil substrate according to a fourth modified embodiment of the first embodiment.

FIG. 8 illustrates a coil arrangement of a motor coil substrate according to a fourth modified embodiment of the first embodiment.

The motor coil substrate has seven coils (C1-C7) and terminals (commutators) (T1-T7) respectively connected to the coils (C1-C7). The quadrangular coils (C1-C7) each include a half-turn first wiring (24F) formed on the first surface of the insulating substrate and a half-turn second wiring (24S) formed on the second surface of the insulating substrate. The half-turn first wiring (24F) and the half-turn second wiring (24S) are connected to each other via an upward via conductor (24AU) and a downward via conductor (24AD).

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The first wiring (24F) of the coil (C2) on the first surface side of the insulating substrate is arranged so as to overlap with the second wiring (24S) of the coil (C1) on the second surface side of the insulating substrate. The first wiring (24F) of the coil (C3) on the first surface side of the insulating substrate is arranged so as to overlap with the second wiring (24S) of the coil (C2) on the second surface side of the insulating substrate. The first wiring (24F) of the coil (C4) on the first surface side of the insulating substrate is arranged so as to overlap with the second wiring (24S) of the coil (C3) on the second surface side of the insulating substrate. The first wiring (24F) of the coil (C5) on the first surface side of the insulating substrate is arranged so as to overlap with the second wiring (24S) of the coil (C4) on the second surface side of the insulating substrate. The first wiring (24F) of the coil (C6) on the first surface side of the insulating substrate is arranged so as to overlap with the second wiring (24S) of the coil (C5) on the second surface side of the insulating substrate. The first wiring (24F) of the coil (C7) on the first surface side of the insulating substrate is arranged so as to overlap with the second wiring (24S) of the coil (C6) on the second surface side of the insulating substrate. In the drawing, the coils (C1-C7) are drawn to each have 3 turns. However, in an embodiment product, the coils are each formed in 35 turns. In the quadrangular coils of the motor coil substrate of the fourth modified embodiment of the first embodiment, an inner diameter of each of the coils can be enlarged as compared to rhombic coils, and a torque can be increased.

Fifth Modified Embodiment of First Embodiment

Figure 9:
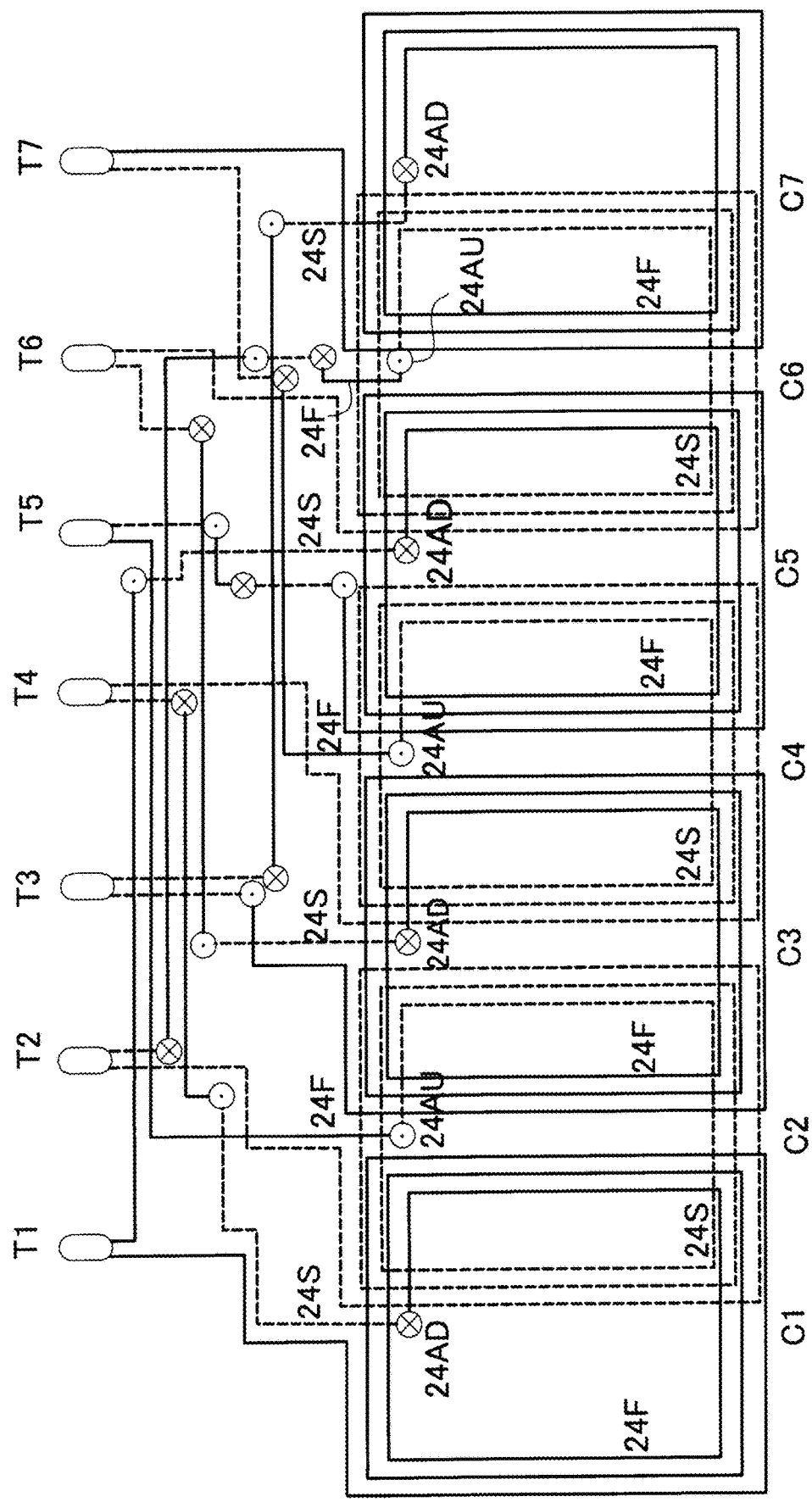
FIG. 9 illustrates coil connection of a motor coil substrate according to a fifth modified embodiment of the first embodiment.

FIG. 9 illustrates a coil arrangement of a motor coil substrate according to a fifth modified embodiment of the first embodiment.

The motor coil substrate has seven coils (C1-C7) and terminals (commutators) (T1-T7) respectively connected to the coils (C1-C7). The coil (C1) includes a first wiring (24F) formed on the first surface of the insulating substrate. The coil (C2) includes a second wiring (24S) formed on the second surface of the insulating substrate. The coil (C3) includes a first wiring (24F) formed on the first surface of the insulating substrate. The coil (C4) includes a second wiring (24S) formed on the second surface of the insulating substrate. The coil (C5) includes a first wiring (24F) formed on the first surface of the insulating substrate. The coil (C6) includes a second wiring (24S) formed on the second surface of the insulating substrate. The coil (C7) includes a first wiring (24F) formed on the first surface of the insulating substrate.

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The coil (C2) on the second surface (S) side of the insulating substrate is arranged so as to partially overlap with the coil (C1) and the coil (C3) on the first surface (F) side of the insulating substrate. The coil (C4) on the second surface (S) side of the insulating substrate is arranged so as to partially overlap with the coil (C3) and the coil (C5) on the first surface (F) side of the insulating substrate. The coil (C6) on the second surface (S) side of the insulating substrate is arranged so as to partially overlap with the coil (C5) and the coil (C7) on the first surface (F) side of the insulating substrate. In the drawing, the coils (C1-C7) are drawn to each have 3 turns. However, in an embodiment product, the coils are each formed in 35 turns. In the quadrangular coils of the motor coil substrate of the fifth modified embodiment of the first embodiment, an inner diameter of each of the coils can be enlarged, and a torque can be increased.

Sixth Modified Embodiment of First Embodiment

Figure 10:
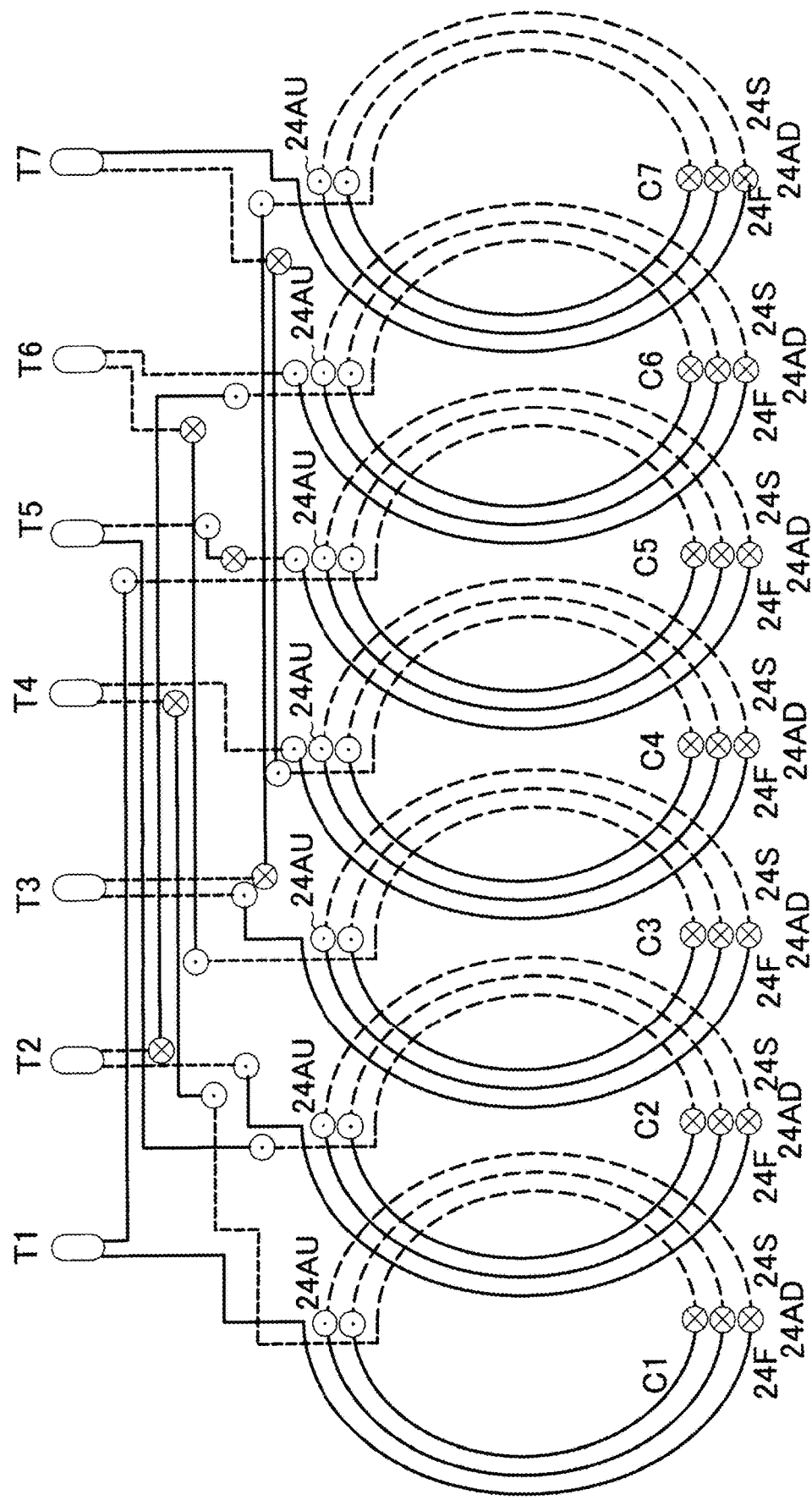
FIG. 10 illustrates coil connection of a motor coil substrate according to a sixth modified embodiment of the first embodiment.

FIG. 10 illustrates a coil arrangement of a motor coil substrate according to a sixth modified embodiment of the first embodiment.

The motor coil substrate has seven coils (C1-C7) and terminals (commutators) (T1-T7) respectively connected to the coils (C1-C7). The circular coils (C1-C7) each include a half-turn first wiring (24F) formed on the first surface of the insulating substrate and a half-turn second wiring (24S) formed on the second surface of the insulating substrate. The half-turn first wiring (24F) and the half-turn second wiring (24S) are connected to each other via an upward via conductor (24AU) and a downward via conductor (24AD).

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The first wiring (24F) of the coil (C2) on the first surface side of the insulating substrate is arranged so as to overlap with the second wiring (24S) of the coil (C1) on the second surface side of the insulating substrate. The first wiring (24F) of the coil (C3) on the first surface side of the insulating substrate is arranged so as to overlap with the second wiring (24S) of the coil (C2) on the second surface side of the insulating substrate. The first wiring (24F) of the coil (C4) on the first surface side of the insulating substrate is arranged so as to overlap with the second wiring (24S) of the coil (C3) on the second surface side of the insulating substrate. The first wiring (24F) of the coil (C5) on the first surface side of the insulating substrate is arranged so as to overlap with the second wiring (24S) of the coil (C4) on the second surface side of the insulating substrate. The first wiring (24F) of the coil (C6) on the first surface side of the insulating substrate is arranged so as to overlap with the second wiring (24S) of the coil (C5) on the second surface side of the insulating substrate. The first wiring (24F) of the coil (C7) on the first surface side of the insulating substrate is arranged so as to overlap with the second wiring (24S) of the coil (C6) on the second surface side of the insulating substrate. In the drawing, the coils (C1-C7) are drawn to each have 3 turns. However, in an embodiment product, the coils are each formed in 35 turns. In the circular coils of the motor coil substrate of the sixth modified embodiment of the first embodiment, a torque can be increased, and smooth rotation can be achieved.

Seventh Modified Embodiment of First Embodiment

Figure 11:
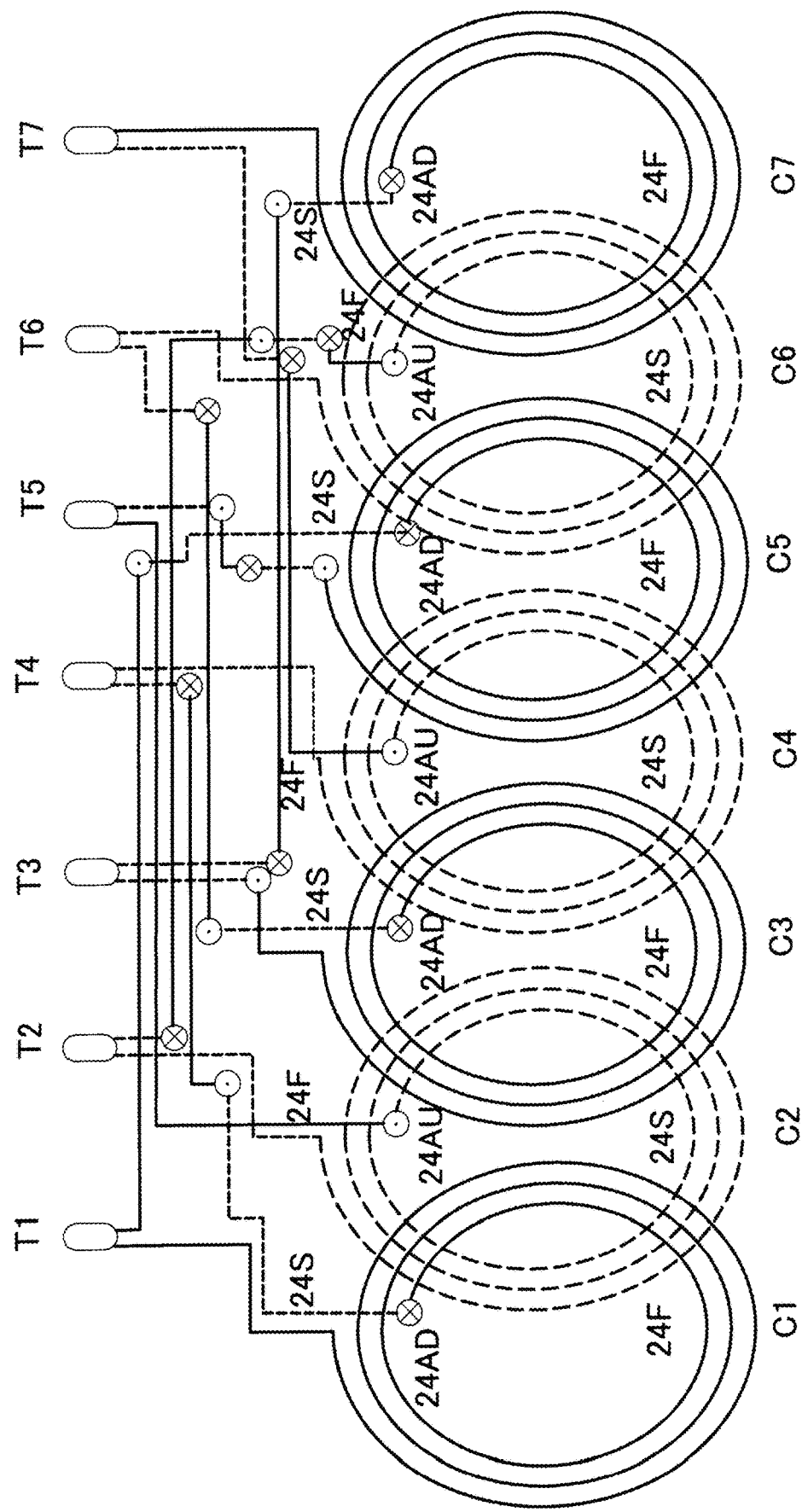
FIG. 11 illustrates coil connection of a motor coil substrate according to a seventh modified embodiment of the first embodiment.

FIG. 11 illustrates a coil arrangement of a motor coil substrate according to a seventh modified embodiment of the first embodiment.

The motor coil substrate has seven coils (C1-C7) and terminals (commutators) (T1-T7) respectively connected to the coils (C1-C7). The coil (C1) includes a first wiring (24F) formed on the first surface of the insulating substrate. The coil (C2) includes a second wiring (24S) formed on the second surface of the insulating substrate. The coil (C3) includes a first wiring (24F) formed on the first surface of the insulating substrate. The coil (C4) includes a second wiring (24S) formed on the second surface of the insulating substrate. The coil (C5) includes a first wiring (24F) formed on the first surface of the insulating substrate. The coil (C6) includes a second wiring (24S) formed on the second surface of the insulating substrate. The coil (C7) includes a first wiring (24F) formed on the first surface of the insulating substrate.

The terminal (T1), together with the coil (C1), is connected to the coil (C5). The terminal (T2), together with the coil (C2), is connected to the coil (C6). The terminal (T3), together with the coil (C3), is connected to the coil (C7). The terminal (T4), together with the coil (C4), is connected to the coil (C1). The terminal (T5), together with the coil (C5), is connected to the coil (C2). The terminal (T6), together with the coil (C6), is connected to the coil (C3). The terminal (T7), together with the coil (C7), is connected to the coil (C4). An end of the coil (C1) connected to the terminal (T1) is connected to the terminal (T4). An end of the coil (C2) connected to the terminal (T2) is connected to the terminal (T5). An end of the coil (C3) connected to the terminal (T3) is connected to the terminal (T6). An end of the coil (C4) connected to the terminal (T4) is connected to the terminal (T7). An end of the coil (C5) connected to the terminal (T5) is connected to the terminal (T1). An end of the coil (C6) connected to the terminal (T6) is connected to the terminal (T2). An end of the coil (C7) connected to the terminal (T7) is connected to the terminal (T3).

The coil (C2) on the second surface (S) side of the insulating substrate is arranged so as to partially overlap with the coil (C1) and the coil (C3) on the first surface (F) side of the insulating substrate. The coil (C4) on the second surface (S) side of the insulating substrate is arranged so as to partially overlap with the coil (C3) and the coil (C5) on the first surface (F) side of the insulating substrate. The coil (C6) on the second surface (S) side of the insulating substrate is arranged so as to partially overlap with the coil (C5) and the coil (C7) on the first surface (F) side of the insulating substrate. In the drawing, the coils (C1-C7) are drawn to each have 3 turns. However, in an embodiment product, the coils are each formed in 35 turns. In the circular coils of the motor coil substrate of the seventh modified embodiment of the first embodiment, a torque can be increased, and smooth rotation can be achieved.

In the above-described embodiment, the motor coil substrate having seven coils is described as an example. However, as long as three or more coils are provided, a motor coil substrate of the embodiment can be formed. Further, in the embodiment, the motor coil substrate is wound 2.5 turns. However, as long as the motor coil substrate is wound more than one turn, the motor coil substrate can be effective.

In Japanese Patent Laid-Open Publication No. HEI 5-276699, since the insulating substrate is wound one turn not multiple turns in a circumferential direction, it is thought that it is unlikely to obtain a high torque with a small DC motor. In Japanese Patent Laid-Open Publication No. 2011-87437, since an upper layer and a lower layer are connected to each other via solder, softening of the solder is expected due to heat generation in a motor, and it is thought that it is difficult to increase reliability with a motor to which a centrifugal force is applied. Further, solder has a high resistance value and it is difficult to increase efficiency.

A motor coil substrate according to an embodiment of the present invention includes: a cylindrical flexible insulating substrate having a first surface and a second surface on an opposite side with respect to the first surface; coils including wirings in spiral shapes provided on the first surface and the second surface of the flexible insulating substrate; and via conductors formed of copper plating penetrating the flexible insulating substrate and connecting the wirings on the first surface to the wirings on the second surface. The flexible insulating substrate is wound more than one turn in a circumferential direction such that the first surface on an inner side and the second surface on an outer side oppose each other.

According to an embodiment of the present invention, since the flexible insulating substrate is wound more than one turn in the circumferential direction such that the first surface on an inner side and the second surface on an outer side oppose each other, a high torque can be obtained with a small motor. The coils including wirings in spiral shapes provided on the first surface and the second surface of the flexible insulating substrate are connected to each other by the via conductors formed of copper plating penetrating the flexible insulating substrate. Therefore, different from solder connection, high reliability can be obtained and, since an electric current flows through the via conductors having low resistances, high efficiency can be realized.

Obviously, numerous modifications and variations of the present invention are possible in light of the above teachings. It is therefore to be understood that within the scope of the appended claims, the invention may be practiced otherwise than as specifically described herein.

What is claimed is:

1. A motor coil substrate, comprising:
    a flexible insulating substrate having a cylindrical shape;
    a plurality of wirings formed on a first surface of the flexible insulating substrate and a second surface of the flexible insulating substrate on an opposite side with respect to the first surface; and
    a plurality of via conductors comprising copper plating penetrating through the flexible insulating substrate such that the plurality of via conductors is connecting the wirings formed on the first surface and the wirings formed on the second surface,
    wherein the plurality of wirings and the plurality of via conductors form a plurality of coils formed in spiral shapes, the flexible insulating substrate is wound more than one turn in a circumferential direction of the cylindrical shape such that the first surface on an inner side of the cylindrical shape and the second surface on an outer side of the cylindrical shape oppose each other, and the plurality of wirings is formed such that each of the coils has a half-turn wiring formed on the first surface, a half-turn wiring formed on the second surface, and one of the via conductors connecting the half-turn wiring formed on the first surface and the half-turn wiring formed on the second surface, and that the half-turn wiring of one coil on the second surface and the half-turn wiring of another coil adjacent to the one coil on the first surface are positioned to partially overlap each other.

2. The motor coil substrate according to claim 1, wherein the flexible insulating substrate is wound 2 or more turns.

3. The motor coil substrate according to claim 2, wherein the plurality of coils is formed such that each of the coils has a rhombic shape.

4. The motor coil substrate according to claim 2, wherein the plurality of coils is formed such that each of the coils has a hexagonal shape.

5. The motor coil substrate according to claim 2, wherein the plurality of coils is formed such that each of the coils has a quadrangular shape.

6. The motor coil substrate according to claim 2, wherein the plurality of coils is formed such that each of the coils has a circular shape.

7. The motor coil substrate according to claim 2, further comprising:
    a commutator formed on the flexible insulating substrate and connected to the plurality of coils.

8. The motor coil substrate according to claim 7, further comprising:
    an angle detection magnet structure formed on the flexible insulating substrate and positioned to correspond to the plurality of coils.

9. The motor coil substrate according to claim 1, further comprising:
    a commutator formed on the flexible insulating substrate and connected to the plurality of coils.

10. The motor coil substrate according to claim 9, further comprising:
    an angle detection magnet structure formed on the flexible insulating substrate and positioned to correspond to the plurality of coils.

11. The motor coil substrate according to claim 9, wherein the plurality of coils is formed such that each of the coils has a hexagonal shape.

12. The motor coil substrate according to claim 9, wherein the plurality of coils is formed such that each of the coils has a quadrangular shape.

13. The motor coil substrate according to claim 9, wherein the plurality of coils is formed such that each of the coils has a circular shape.

14. A motor coil substrate, comprising:
    a flexible insulating substrate having a cylindrical shape;
    a commutator formed on the flexible insulating substrate;
    an angle detection magnet structure formed on the flexible insulating substrate;
    a plurality of wirings formed on a first surface of the flexible insulating substrate and a second surface of the flexible insulating substrate on an opposite side with respect to the first surface; and
    a plurality of via conductors comprising copper plating penetrating through the flexible insulating substrate such that the plurality of via conductors is connecting the wirings formed on the first surface and the wirings formed on the second surface, wherein the plurality of wirings and the plurality of via conductors form a plurality of coils formed in spiral shapes such that the commutator is connected to the plurality of coils and that the angle detection magnet structure is positioned to correspond to the plurality of coils, and the flexible insulating substrate is wound more than one turn in a circumferential direction of the cylindrical shape such that the first surface on an inner side of the cylindrical shape and the second surface on an outer side of the cylindrical shape oppose each other.

15. The motor coil substrate according to claim 14, wherein the plurality of wirings comprises one of the coils formed on the first surface of the flexible insulating substrate, and one of the coils formed on the second surface of the flexible insulating substrate such that the one of the coils formed on the first surface and the one of the coils formed on the second surface are positioned to partially overlap each other.

16. The motor coil substrate according to claim 14, wherein the plurality of coils is formed such that each of the coils has a rhombic shape.

17. The motor coil substrate according to claim 14, wherein the plurality of coils is formed such that each of the coils has a hexagonal shape.

18. The motor coil substrate according to claim 14, wherein the plurality of coils is formed such that each of the coils has a quadrangular shape.

19. The motor coil substrate according to claim 14, wherein the plurality of coils is formed such that each of the coils has a circular shape.

20. The motor coil substrate according to claim 14, wherein the flexible insulating substrate is wound 2 or more turns.

* * * * *